United States Patent [19]

Karadsheh et al.

[11] 4,433,370
[45] Feb. 21, 1984

[54] MULTIPLE PHASE CHOPPER CURRENT LIMITING

[75] Inventors: Sam M. Karadsheh, Troy; Thomas A. Radomski, Utica, both of Mich.

[73] Assignee: General Motors Corporation, Detroit, Mich.

[21] Appl. No.: 362,274

[22] Filed: Mar. 26, 1982

[51] Int. Cl.³ .................... H02M 3/315; H02P 7/28; H02H 7/122

[52] U.S. Cl. ...................................... 363/124; 363/57; 318/139; 318/345 E; 318/434; 361/31; 361/87

[58] Field of Search ................. 363/124, 50, 57, 65, 363/71–72, 135–136, 39–41; 318/139, 341, 345 C, 345 E, 345 G, 386, 390, 395, 416, 430, 434; 361/24, 30–31, 79, 86–87; 323/272, 285

[56] References Cited

U.S. PATENT DOCUMENTS

| | | | |
|---|---|---|---|
| 3,351,841 | 11/1967 | Lipman et al. | 363/136 |
| 3,564,337 | 2/1971 | MacGeorge | 318/434 X |
| 3,663,942 | 5/1972 | Jakobsen | 363/57 |
| 3,944,856 | 3/1976 | Horie | 363/124 |
| 3,958,173 | 5/1976 | Christianson et al. | 363/124 |
| 4,032,825 | 6/1977 | Klimo | 318/139 |
| 4,084,119 | 4/1978 | Kato et al. | 318/434 |
| 4,090,115 | 5/1978 | Franz, Jr. | 318/341 |
| 4,150,324 | 4/1979 | Naito | 318/139 |
| 4,161,010 | 7/1979 | Mann et al. | 361/79 |
| 4,257,092 | 3/1981 | Prines et al. | 363/124 |

Primary Examiner—Peter S. Wong
Attorney, Agent, or Firm—Mark A. Navarre

[57] ABSTRACT

The current in each phase of a multiple phase chopper is sensed and compared to a reference overcurrent value. Any chopper phase reaching overcurrent and any chopper phase on for a longer period of time are turned off immediately. The conduction periods of chopper phases that have been on for a shorter period of time than the overcurrent phase are similarly shortened to maintain balanced phase conduction and minimize the ripple content of the source current. The phase relationship among the various chopper phases is adjusted in response to an overcurrent turn-off to allow the commutation network associated with such phase to be adequately charged before the generation of a current turn-on for another phase.

5 Claims, 14 Drawing Figures

MULTIPLE PHASE CHOPPER CURRENT LIMITING

This application is related to pending U.S. patent application Ser. No. 292,250 filed Aug. 12, 1981, now U.S. Pat. No. 4,366,531, which is a continuation-in-part of U.S. Ser. No. 188,150 filed Sept. 17, 1980, now abandoned.

The invention described herein relates to a system for current limiting a chopper of the type described in the above-referenced patent applications.

Silicon controlled rectifier (SCR) choppers have been used to control the application of power from a source of direct voltage such as a storage battery to an electric load such as a vehicular traction motor. For such applications, it is necessary to provide a commutation network for terminating the conduction of the SCR. The commutation network is "charged" by the source when the SCR is nonconductive and the stored energy is subsequently used to reverse bias the SCR for terminating the following conduction period. In such a system, the chopping frequency and the duration of the conduction period are adjusted to control the average power delivered to the load.

Generally, higher chopping frequencies reduce motor ripple current and motor frame losses. However, the time required for commutation of the SCR effectively limits the chopping frequency to approximately 1 kilohertz. By connecting two or more SCR choppers in parallel between the source and load to form a multiple phase chopper, the chopping frequency of the system is effectively increased even though the chopping frequency of each SCR is unchanged. Furthermore, a multiple phase chopper offers better battery current form factor than can be obtained with a single phase chopper. The term "form factor" as used above, is a quantitative measurement and is defined as the ratio of the RMS (root mean square) battery current to the average battery current. With a multiple phase chopper system, the SCR's are individually biased on and off by a control unit responsive to a load demand signal. Typically, the phase conduction periods are equal in duration to provide balanced system operation and loading. In addition, the conduction periods are initiated according to a predetermined phase relationship for minimizing battery current ripple content and thus, form factor. The load demand is satisfied by varying the conduction period duration.

Commutation failures have been observed in multiple phase SCR choppers when a current turn-off in one of the chopper phases occurs within a predetermined time period immediately preceding a current turn-on in another chopper phase. It has been determined that such failures occur because the source and lead-in cable inductance limits the ability of the source to instantaneously supply power to both the oncoming phase SCR and the off going phase commutation network. As a result, the oncoming phase SCR diverts the limited source current away from the off going phase commutation network, and as a result, the network is not sufficiently charged and fails to commutate on the following conduction period. This condition is obviously undesirable and results in excessive load current, which if not properly limited, could damage or destroy further system components.

Earlier filed application Ser. No. 292,250 discloses a system for controlling the phase relationship among the various chopper phases in a manner to avoid commutation failure when the conduction period is such that the normal phase relationship would result in the generation of a current turn-off in one phase within the predetermined time preceding a current turn-on in another phase. Under such conditions, the normal phase relationship is modified by an amount at least as great as the predetermined period so that the current turn-off does not occur within the predetermined period.

This invention relates to a system for current limiting a chopper of the type described above. Generally, current limiting is employed in motor control applications in order to limit the motor torque and to protect the motor and chopper from damage or destruction due to excessive overcurrent. For a multiple phase chopper, the most reliable protection is achieved by monitoring the individual phase currents separately to detect an overcurrent condition in any phase. If an overcurrent condition is detected, the switching device associated with the overcurrent phase is biased to a nonconductive state to terminate conduction in the overcurrent phase.

This invention recognizes that a current limiting system may bring about a commutation failure of the type described above, if, due to an overcurrent, the current limiting function generates a current turn off for one phase within the predetermined period immediately preceding a current turn on for another phase. Under such conditions, the oncoming phase tends to divert source current away from the commutation network associated with the off-going phase so that the commutation network is not sufficiently charged and fails to commutate in the following conduction.

Accordingly it is an object of this invention to provide a current limiting system for a multiple phase SCR chopper wherein the conduction period of any overcurrent phase is terminated in a manner to permit sufficient commutation network charging for such phase.

It is a further object of this invention to provide an improved controller for a DC multiple phase SCR chopper wherein the conduction period of an overcurrent phase is immediately terminated and wherein the initiation of current in the other chopper phases is controlled in a manner to prevent such termination from causing a commutation failure.

It is another object of this invention to provide an improved controller of the above type wherein the conduction periods of such other chopper phases are controlled to be equal to the conduction period of the overcurrent phase.

These and other objects are carried forward with a DC multiple phase SCR chopper by sensing the current in each chopper phase and by generating a current turn-off in any overcurrent chopper phase. The initiation of current flow in the other phases is controlled in a manner to prevent the turn-off in the overcurrent phase from occurring within the predetermined period preceding a current turn-on in such other phases. When possible, the conduction period for a current limited phase is maintained in the other phases for a certain time after the overcurrent turn-off is generated, after which the conduction period is returned to the level existing before the sensing of such overcurrent conditions.

IN THE DRAWINGS

FIG. 3A illustrates conventional chopper control with timing pulses in the commutation failure region, and FIG. 3B illustrates how the chopper control circuit of U.S. Ser. No. 292,250 avoids commutation failure by modifying the SCR phase relationship.

Figure 1:
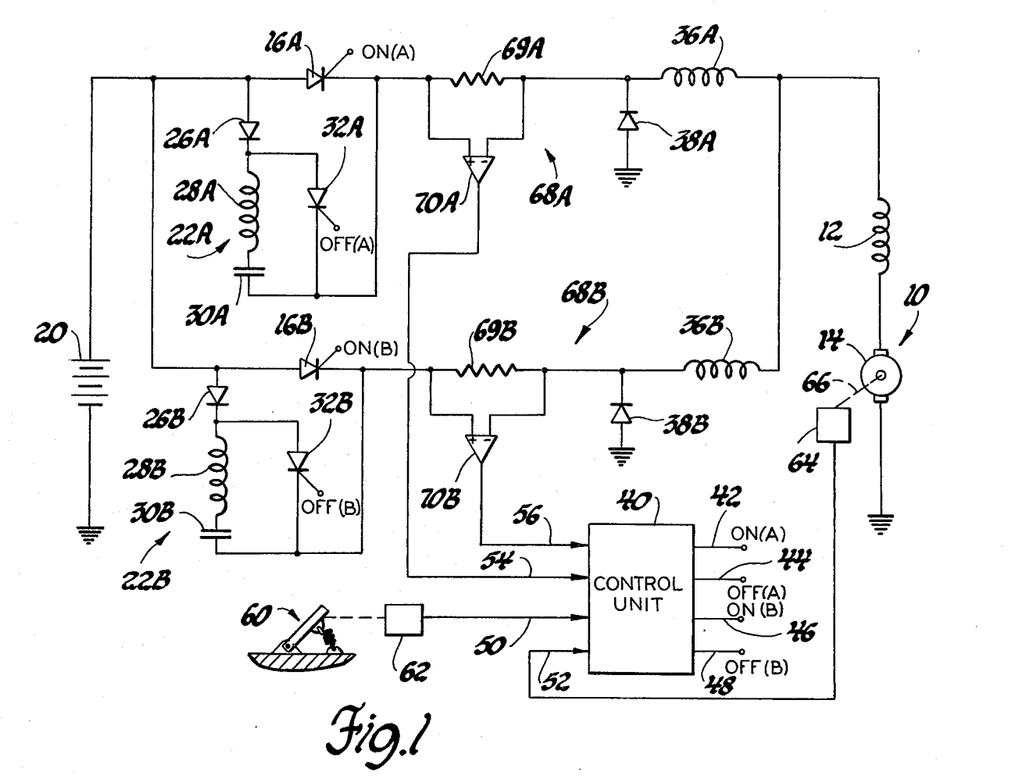
FIG. 1 is a schematic illustration of a two-phase SCR chopper and the control unit of this invention.

Referring now to FIG. 1, reference numeral 10 generally designates a vehicular traction motor comprising a series field winding 12 and an armature winding 14. This invention is, of course, applicable to other types of motors as well but a series field motor is shown for simplicity. SCR's 16A and 16B comprise a two-phase chopper, SCR 16A defining phase A and SCR 16B defining phase B. Accordingly, each circuit element associated with phase A or phase B is identified by the appropriate alphameric subscript. SCR's 16A and 16B are each selectively actuated to initiate current flow from storage battery 20 to traction motor 10 and each has a commutation network 22A, 22B associated therewith for commutating the respective SCR to terminate a conduction period. Commutation networks 22A and 22B are identical and include a diode 26A or 26B, an inductor 28A and 28B, a capacitor 30A or 30B, and an SCR 32A or 32B. When the respective phase SCR 16A or 16B is in its nonconductive state, the capacitor 30A or 30B is charged or "rung-up" through diode 26A or 26B, inductor 28A or 28B, and traction motor 10 to a voltage approximately equal to the terminal voltage of battery 20. The diode 26A or 26B prevents the capacitor 30A or 30B from discharging back into battery 20. When in this condition, the commutation network 22A or 22B is said to be "charged."

Once the phase SCR 16A or 16B is conductive and it is desired to terminate such conduction, the respective SCR 32A or 32B is rendered conductive and the charge on the capacitor 30A or 30B reverse biases the phase SCR 16A or 16B to terminate its conduction. The commutating SCR 32A or 32B does not need a separate commutation network as the network LC elements form a resonant circuit for natural commutation. Inductors 36A and 36B filter the current supplied to traction motor 10, and free-wheeling diodes 38A and 38B operate in a well-known manner to circulate the inductive energy stored in inductors 36A and 36B and traction motor windings 12 and 14 when SCR's 16A or 16B are biased to a nonconductive state.

Reference numeral 40 designates a control unit for developing control pulses for SCR's 16A, 16B, 32A and 32B. Thus, the output line 42 designated ON(A) is applied to the gate electrode of SCR 16A, also designated as ON(A). Similarly, output line 44, designated as OFF(A) is applied to the gate terminal of SCR 32A; output line 46, designated as ON(B) is applied to the gate terminal of SCR 16B; and output line 48, designated OFF(B) is applied to the gate terminal of SCR 32B.

Inputs to control unit 40 include a load demand signal on line 50, a motor speed signal on line 52, a phase A current signal on line 54 and a phase B current signal on line 56. The load demand signal on line 50 is representative of the desired power output of traction motor 10 and in an electric vehicle application, for example, may be determined as a function of the position of a throttle or accelerator pedal, as designated by reference numeral 60. Reference numeral 62 designates a transducer such as a rotary potentiometer responsive to the position or setting of accelerator pedal 60 for developing an electrical representation of the same on line 50. The motor speed signal on line 52 is obtained from a tachometer 64 responsive to the rotational velocity of motor 10 as designated by dashed lines 66.

The phase A and phase B current signals on lines 54 and 56 are obtained from conventional current shunt circuits as designated by reference numerals 68A and 68B. Each shunt circuit 68A and 68B comprises a resistance element 69A or 69B connected in series between the phase SCR 16A or 16B and motor 10, and a differential amplifier 70A or 70B for generating an electrical signal on lines 54 or 56, respectively, that corresponds to the voltage drop across the respective resistance element 69A or 69B.

Figure 7:
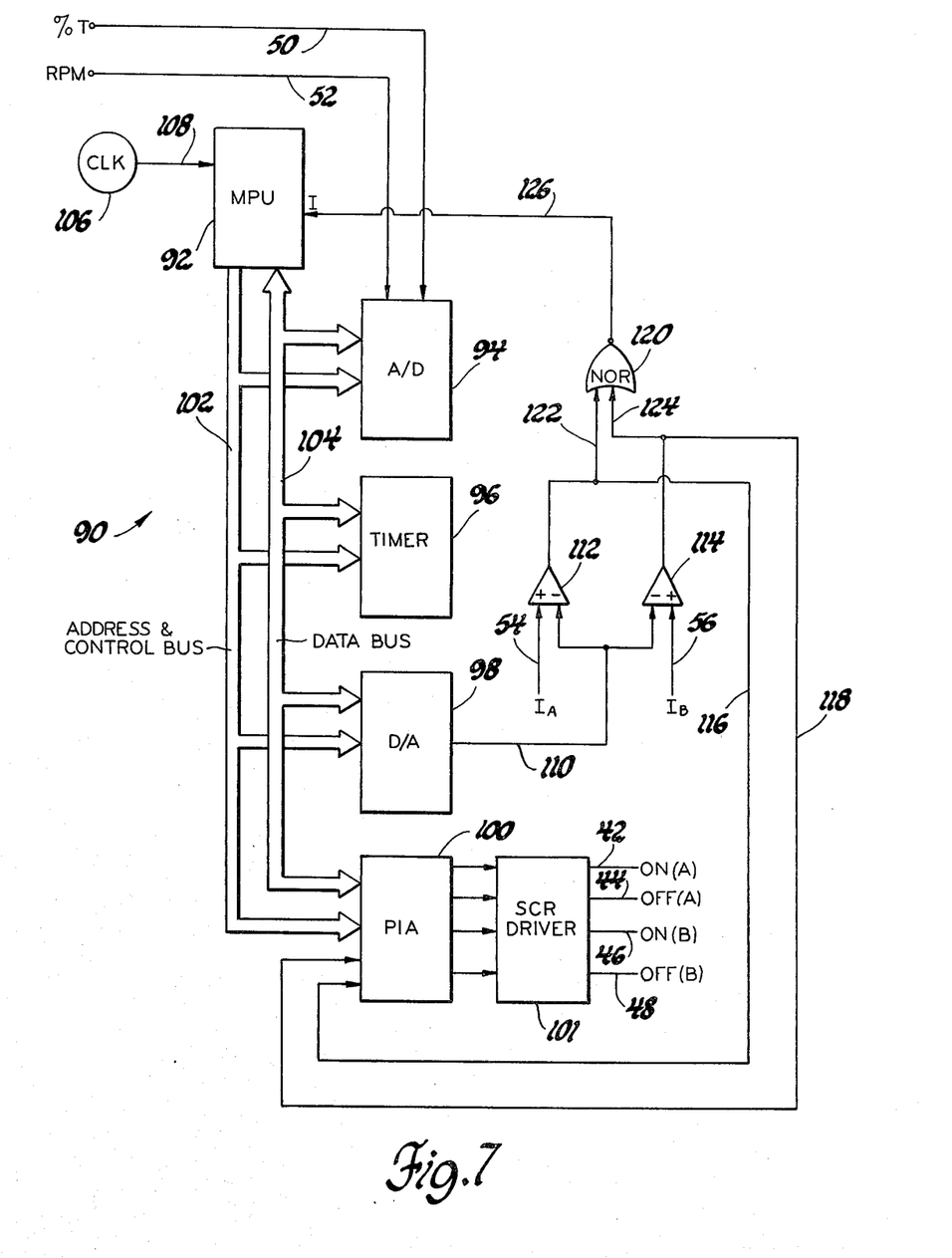
FIG. 7 is a block diagram of the control unit depicted in FIG. 1.

The internal circuitry of control unit 40 is depicted in FIG. 7. As in FIG. 1, the parameters of throttle (%T) and motor speed (RPM) are applied as inputs via lines 50 and 52 and the outputs ON(A), OFF(A), ON(B) and OFF(B) are outputted on lines 42, 44, 46 and 48, respectively.

Reference numeral 90 generally designates a microprocessor-based controller comprising MPU 92 and Analog-to-Digital converter (A/D) 94, timer 96, Digital-to-Analog converter (D/A) 98 and Peripheral Interface Adapter (PIA) 100. The above devices are interconnected via an Address and Control Bus 102 and a bidirectional Data Bus 104. Clock 106 provides a high frequency pulse input to MPU 92 via line 108 for synchronizing the operation of the devices. The basic operation of elements 92–100 is well-known to those skilled in the art, and it will be appreciated that such elements may be any of a number of commercially available devices. Thus, MPU 92 may be the MC6802 processor, timer 96 may be the MC6840 programmable timer, and PIA 100 may be the MC6821, all manufactured by Motorola Semiconductor Products, Inc., Phoenix, Ariz. A/D converter 94 may be the ADC0808, manufactured by National Semiconductor Corporation, Santa Clara, Calif., and D/A converter 98 may be the AD7524, manufactured by Analog Devices, Inc., Norwood, Mass.

The throttle and speed inputs are applied to A/D converter 94 via lines 50 and 52, and control pulse output lines 42, 44, 46 and 48 are outputs of PIA 100 as amplified and processed by SCR driver 101. The output of D/A converter 98 is an analog voltage representative of the current limit value, which is determined as a function of motor speed (RPM). Such voltage is applied via line 110 as an input to comparators 112 and 114. The voltage representative of the phase A current is applied as a second input to comparator 112 via line 54 and the voltage representative of the phase B current is applied as a second input to comparator 114 via line 56. If the phase A current exceeds the reference limit, the output of comparator 112 rises to a logic 1 voltage level, and if the phase B current exceeds the reference limit, the output of comparator 114 rises to a logic 1 voltage level. The outputs of comparators 112 and 114 are applied as inputs to PIA 100 via lines 116 and 118, respectively. The outputs of comparators 112 and 114 are also applied as inputs to NOR gate 120 via lines 122 and 124. The output of NOR gate 120 is applied to the Interrupt input of MPU 92 via line 126. If the current in either phase A or phase B exceeds the reference limit on line 110, line 126 drops to a zero logic level and generates an internal interrupt in MPU 92. As will be later seen, the generation of an interrupt by line 126, causes MPU 92 to suspend the execution of the main program depicted in FIGS. 8 and 9 and to execute instead the subroutine program depicted in FIG. 10.

Timer 96 comprises three separately controllable timers, designated hereinafter as Timer 1, Timer 2 and Timer 3. The timers are of the programmable type and are controlled to receive a digital number from Data Bus 104 and to decrement the number at a specified clock rate (such as the MPU clock rate) in response to start and stop commands from MPU 92. The stored count may be read by MPU 92 at any time, and when the stored count is decremented to zero, the timer "triggers," meaning that the timer develops an output pulse that may be read by MPU 92 via Data Bus 104.

Figure 2:
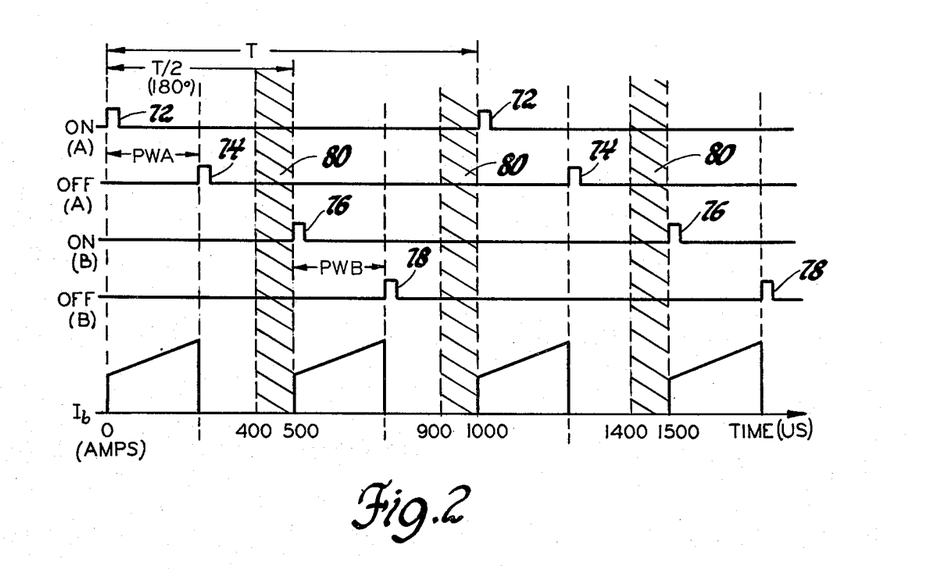
FIG. 2 is a timing diagram illustrating normal operation of the chopper illustrated in FIG. 1.

FIG. 2 illustrates typical control pulses developed by control unit 40 and the resulting battery current ($I_b$) applied to traction motor 10. The pulses appearing on line 42 and designated as ON(A) in FIG. 1, are shown in the trace ON(A) and are designated by reference numeral 72. Similarly, pulses appearing on line 44 are shown in the trace OFF(A) and are designated by reference numeral 74; the pulses appearing on line 46 are shown in trace ON(B) and are designated by reference numeral 76; and the pulses appearing on line 48 are shown in trace OFF(B) and are designated by reference numeral 78.

The chopping period T for each phase 16A and 16B is shown constant at 1000 microseconds (us) corresponding to a chopping frequency of 1 kilohertz, and the phase relationship between turn-on pulses 72 and 76 is maintained at 180°, or (T/2) to minimize battery current ripple content. Thus, the turn-on pulse 72 for phase A (the Master phase) occur every 1000 microseconds, and the turn-on pulse 76 for phase B (the Slave phase) lag the turn-on pulses 72 for phase A by 500 microseconds. The turn-off pulses 74 and 78 for SCR's 32A and 32B are developed so that the conduction period of phase A (PWA) is equal in duration to the conduction period of phase B (PWB). For the load point illustrated in FIG. 2, the conduction period (PWA) or (PWB) is approximately 250 microseconds for a duty cycle of 25%.

The shaded regions 80 preceding each turn-on pulse 72 or 76 represent forbidden zones for a turn-off pulse 74 or 78. The regions 80 are equal in duration and correspond to the time required to charge the commutation networks 22A and 22B. It will be appreciated that this time may be calculated as a function of the SCR load current, the type of commutation network and the circuit element values contained therein. For the commutation networks illustrated in FIG. 1 wherein inductors 28A and 28B are 6 microhenrys (uH) and wherein capacitors 30A and 30B are 20 microfarads (uF), the time required for adequate charging is approximately 100 microseconds. Accordingly, each shaded region 80 is 100 microseconds wide and a commutation failure will occur if a turn-off pulse 74 or 78 occurs therein. For the load point illustrated in FIG. 2, the turn-off pulses 74 and 78 are not within the shaded regions 80 and the phase SCR's 16A and 16B are commutated successfully as may be seen in the resulting trace of battery current ($I_b$) versus time.

Figure 3A:
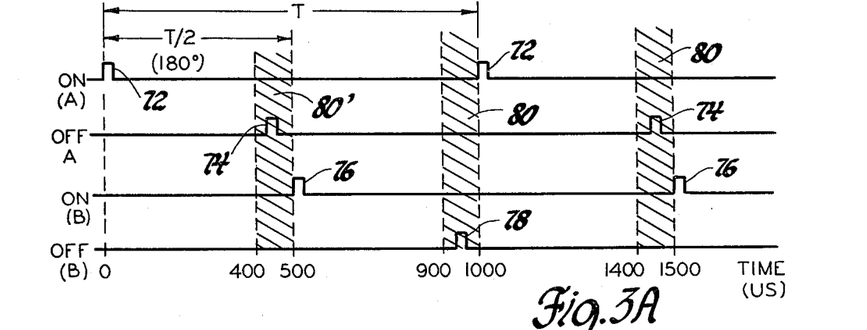
FIGS. 3A and 3B are timing diagrams illustrating the operation of the chopper shown in FIG. 1 at a conduction period for which the normal phase relationship results in a commutation failure.
Figure 3B:
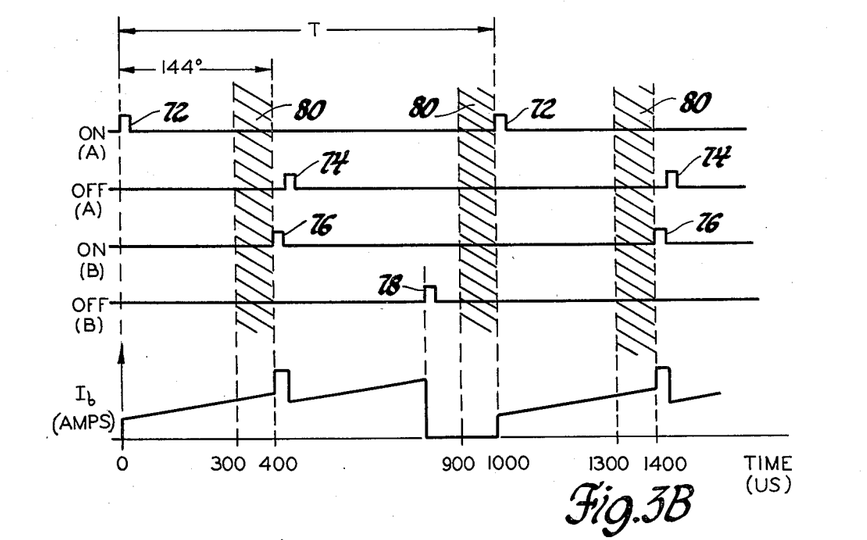

FIGS. 3A and 3B illustrate chopper operation at a phase conduction period of approximately 450 microseconds for a duty cycle of 45%. FIG. 3A illustrates the control pulses if the phase separation between phases A and B is maintained at 180° while FIG. 3B illustrates the control pulses when the phase separation is modified according to the teachings of above-referenced U.S. Ser. No. 292,250. Battery current ($I_b$) is not shown for FIG. 3A since the occurrence of turn-off pulses 74 and 78 in region 80' results in commutation failures and hence a destructively large battery current. It should be noted at this point that an overcurrent due to a commutation failure cannot be limited by applying a turn-off pulse to the commutation network SCR 32A or 32B since the respective commutation network 22A or 22B is not charged. Hence, further current protection means such as a circuit breaker or fusible link should be provided in the event such a failure occurs.

According to the teachings of Ser. No. 292,250, commutation failure due to conditions such as those depicted in FIG. 3A are avoided by modifying the phase relationship between phases A and B so that a turn-off pulse 74 or 78 does not occur in the shaded region 80. More particularly, and as shown in FIG. 3B, Ser. No. 292,250 teaches that current turn-on in phase B should be advanced or LEFT-SHIFTED by an amount at least as great as the predetermined time represented by region 80 when the phase conduction period determined according to the input demand signal falls between 400 and 500 microseconds for a duty cycle between 40% and 50%. In FIG. 3B, phase B is advanced by exactly 100 microseconds which corresponds to a phase separation between phases A and B of 144°. Obviously, the current turn-on for phase B could be advanced even further but the resulting phase relationship would needlessly increase battery current ripple content. The modified phase relationship is maintained until the load point as determined by the load demand signal on line 50 changes sufficiently so that a turn-off pulse 74 or 78 would not occur in a shaded region 80 at 180° phase separation. Thus, as the conduction period duration increases from minimum to maximum, the phase separation between phases A and B will at first be 180°. When the conduction period increases to 400 microseconds, the phase relationship is modified to 144°, and when the conduction period is increased to 500 microseconds, the phase relationship is restored to 180°. When the phase conduction period decreases from its maximum value to its minimum value, the above-described sequence occurs in reverse order.

As indicated, the 400 and 500 microsecond values referred to above define the limits of a forbidden zone preceding a turn-on pulse and correspond to a chopping frequency of 1 kilohertz (kHz)—a chopping period T of 1000 microseconds. In somewhat more general terms, the upper limit of 500 microseconds is given according to the expression T/2, and the lower limit of 400 microseconds is given according to the expression $(T/2) - T_c$ where $T_c$ is the time required to charge a commutation network, or the width of a forbidden zone 80.

The method of operation described above maintains equal phase conduction periods at either phase separation so that the average power and hence the torque response of motor 10 is continuous and smooth over the entire range of input signal values. It will be seen by reference to the ($I_b$) trace to FIG. 3B that the battery ripple current content is slightly increased during operation at 144° as compared to operation at 180°. In normal operation, however, the modified relationship is employed over only 10% of the range of chopper duty cycles (100 microseconds/1000 microseconds), and as a result, the battery current ripple content is increased only marginally by the phase control.

Current limit operation according to this invention is performed according to the following rules. When a chopper phase reaches current limit, it and any other phase that has been on for a longer period of time are turned off immediately. The conduction periods of other phases that have been on for a shorter period of time or that have not yet been turned on are similarly shortened in order to provide balanced phase conduction and to minimize battery current ripple content. Of course, an overcurrent turn-off pulse may be generated either within or outside of an otherwise forbidden zone, depending on the time of the overcurrent condition.

This invention recognizes that the overcurrent turn-off may occur within a forbidden region and thereby cause a commutation failure in the next chopper cycle. The invention described herein features a control system and method for implementing the above-mentioned rules and for controlling the phase relationship among the chopper phases in a manner to prevent the overcurrent turn-off from falling within a forbidden region preceding a current turn-on.

The various chopper operating conditions that may be present at the occurrence of a phase overcurrent, and the system response to such overcurrent, are detailed below:

A. Both phases are conductive; phase A has been on longest.
B. Both phases are conductive, phase B has been on longest.

In conditions A and B, a current turn-off due to an overcurrent condition cannot fall within a forbidden zone 80 since both phases are on. According to the rules given above, the phase reaching the current limit and all other phases that have been on for a longer period of time are turned off immediately. Thus, in condition A, if phase B reaches current limit, both phases A and B are shut off immediately. If the phase which has been on longest reaches the current limit, it is shut off immediately and the conduction period of the other phase is similarly shortened to balance phase conduction. Thus, in case A, if phase A reaches current limit, phase A is shut off immediately and the conduction period of phase B is shortened to that of phase A. It will be apparent by analogy that the system response is similar for case B.

C. Only phase A is conductive.
D. Only phase B is conductive.

In cases C and D above, a current turn off due to an overcurrent condition may or may not fall within a forbidden zone 80. Such occurrence may be determined by MPU 92 as will later be explained. If the overcurrent condition does not occur within a forbidden zone, the overcurrent phase (phase A in case C; phase B in case D) is turned off immediately, and the conduction period of the other phase is similarly shortened to maintain balanced phase condition. If it is determined that the overcurrent condition will otherwise occur in a forbidden zone 80, the system of the invention controls the phase relationship among phases A and B to shift the forbidden zone so that the overcurrent turn off occurs outside the forbidden zone. The forbidden zones 80 are shifted by either advancing or retarding the phase current turn on in the other phase, as will be explained in reference to FIGS. 4 through 6.

Figure 4A:
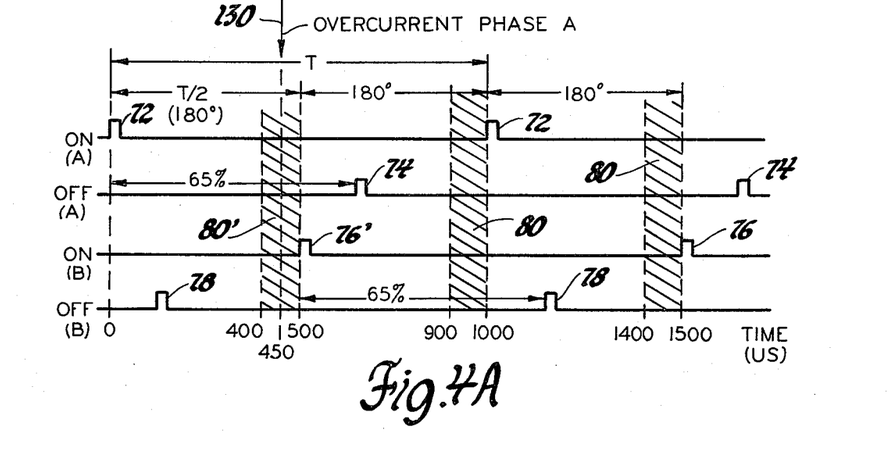
FIGS. 4A, 4B, 5A, 5B, 6A and 6B are timing diagrams depicting chopper operation at various load points according to the teachings of this invention. In each Figure, diagram A depicts operation under normal conditions, and diagram B depicts operation under overcurrent conditions.
Figure 4B:
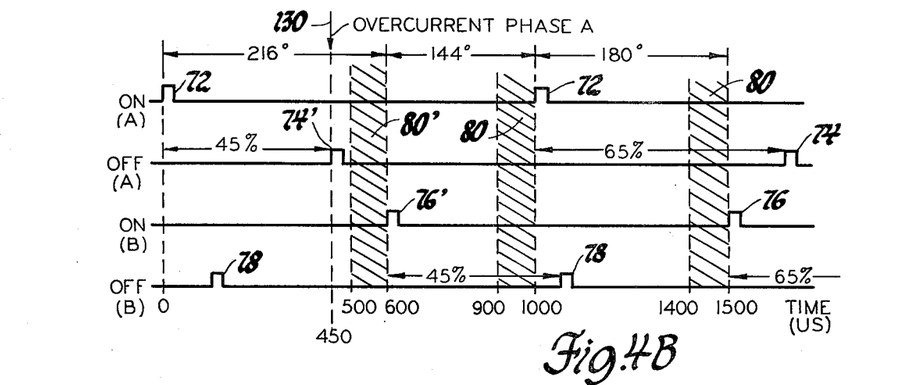
Figure 5A:
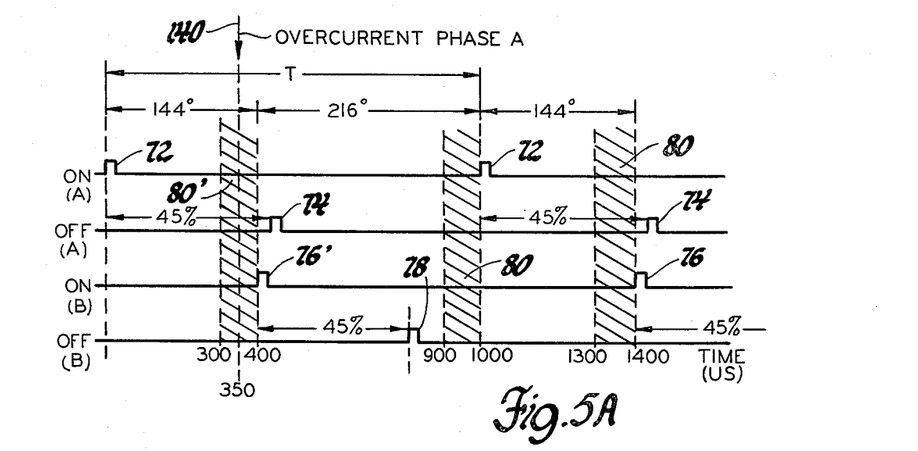
Figure 5B:
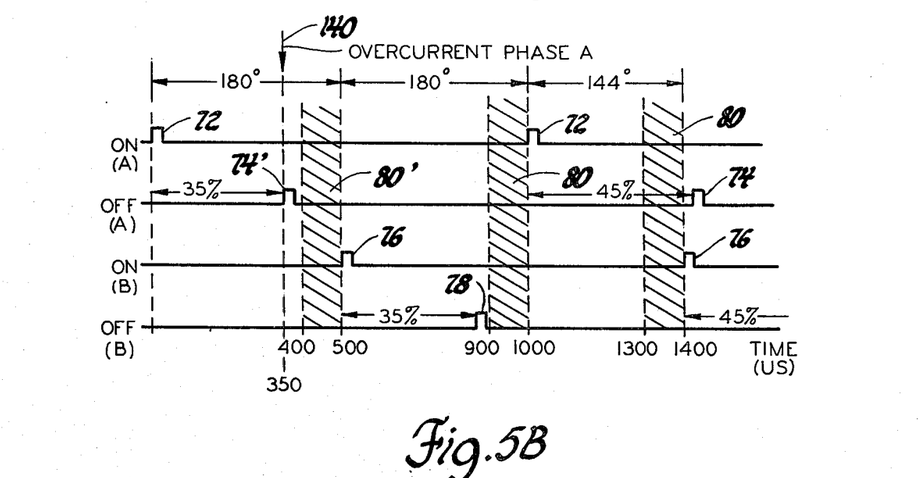
Figure 6A:
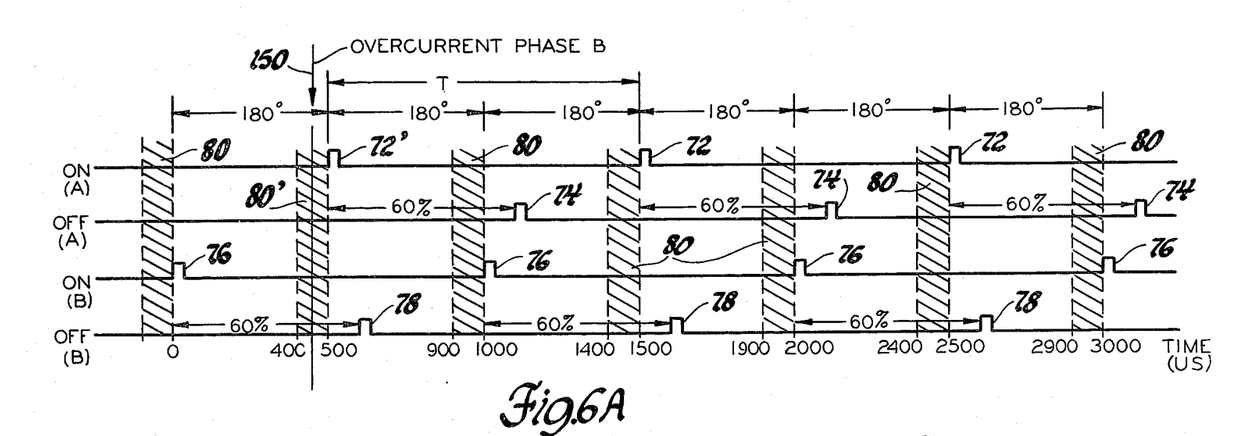
Figure 6B:
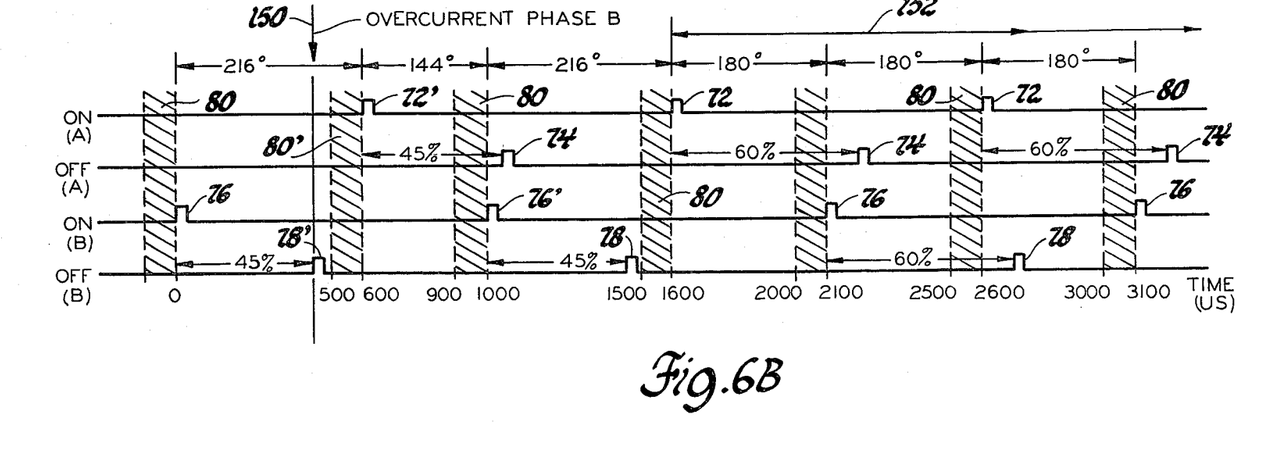

FIG. 4A illustrates the condition wherein phase A reaches overcurrent during an otherwise forbidden zone and wherein the normal phase relationship between phases A and B (180°) is in effect. FIG. 5A illustrates the condition wherein phase A reaches overcurrent during an otherwise forbidden zone and wherein the modified phase relationship between phases A and B (144°) is in effect. FIG. 6A illustrates the condition wherein phase B reaches overcurrent during an otherwise forbidden zone. It will be observed in reference to FIGS. 4 to 6 that the reference numerals used in FIGS. 2 and 3 have been used to designate the SCR control pulses and forbidden zones in FIGS. 4 to 6. Also, as in FIGS. 2 and 3, the chopping frequency depicted in FIGS. 4-6 is 1 kilohertz. Primed reference numerals in FIGS. 4-6 designate control pulses or forbidden zones that are modified or shifted to prevent commutation failure due to overcurrent.

Referring now more particularly to FIGS. 4A and 4B, reference numeral 130 designates the occurrence of an overcurrent condition in phase A of the chopper. FIG. 4A depicts normal chopper operation at the given load point—about 65% duty cycle. It will be seen in reference to FIG. 4A that the overcurrent condition occurs at a time that is normally within a forbidden zone 80' preceding the phase B turn-on pulse 76'. If the turn-off pulse is generated within the forbidden zone, a commutation failure will result in the following cycle.

FIG. 4B depicts the chopper operation according to the teachings of this invention. When the overcurrent condition is sensed, the turn-on pulse 76' is delayed or RIGHT-SHIFTED by an amount equal to or greater than the forbidded zones thereby shifting the forbidden zone 80' by 100 microseconds so that the overcurrent turn-off pulse 74' falls outside the forbidden zone 80'. Thus, the prevailing phase relationship between phases A and B of 180° is modified when an overcurrent condition in phase A occurs during an otherwise forbidden zone to 216° is illustrated in FIG. 4B. Due to the overcurrent condition, the conduction period of phase A is shortened from 65% duty cycle to 45% duty cycle. Accordingly, the conduction period of phase B is similarly shortened to 45% duty cycle to maintain balanced phase conduction. On the following chopper cycle, the phase separation between phases A and B is returned to 180° and the conduction periods of phases A and B are returned to 65% duty cycle, assuming a 65% duty cycle is still required to satisfy input demands.

Referring now more particularly to FIGS. 5A and 5B, reference numeral 140 designates the occurrence of an overcurrent condition in chopper phase A. FIG. 5A depicts normal chopper operation at a duty cycle of approximately 45% and wherein phase B is LEFT-SHIFTED for a phase relationship of 144° in accordance with the teachings of U.S. Ser. No. 292,250. As indicated earlier in reference to that application, the modification of the phase relationship from 180° to 144° is necessary when the input demand and therefore the chopper duty cycle is such that the predicted turn-off pulses 74 and 78 would wotherwise fall within forbidden zones 80'. This invention recognizes the potential occurrence of an overcurrent within the shifted forbidden zone 80' as depicted in FIG. 5A.

FIG. 5B depicts the operation of the control system according to the teachings of this invention for cancelling the LEFT-SHIFTED operation to reestablish the normal phase relationship of 180° under the condition described above. A turn-off pulse 74' is generated immediately in response to the sensed overcurrent condition, and due to the 180° phase relationship between phases A and B, the turn-off pulse 74' falls outside the forbidden zone 80'. Due to the overcurrent condition, the conduction period of phase A is shortened to 35% duty cycle and accordingly, the following conduction period of phase B is similarly shortened to 35% duty cycle. In the next chopper cycle, the phase relationship between phases A and B is returned to 144° and the conduction periods of phases A and B are returned to 45% duty cycle, assuming that a 45% duty cycle is required to satisfy input demand.

Referring now more particularly to FIGS. 6A and 6B, reference numeral 150 designates the occurrence of an overcurrent condition in chopper phase B. FIG. 6A depicts normal chopper operation at 60% duty cycle and wherein the phase relationship between phases A and B is 180°. It will thus be seen that with normal operation under such conditions, the overcurrent condition falls within a forbidden zone 80' preceding the phase A turn-on pulse 72'.

FIG. 6B depicts chopper operation according to the teachings of this invention. When the overcurrent condition 150 is detected, a phase B turn-off pulse 78' is immediately generated and the phase A turn-on pulse 72' is delayed or RIGHT-SHIFTED by 100 microseconds thereby shifting the forbidden zone 80' by 100 microseconds so that the turn-off pulse 78' occurs outside a forbidden zone 80. Due to the overcurrent condition, the conduction period of phase B is shortened from 60% duty cycle to 45% duty cycle and, accordingly, phases A and B in the next chopper cycle are similarly shortened 45% duty cycle to maintain balanced phase conduction. During the modified phase relationship as described above, the phase B turn-on pulses 76' occur 144° after the preceding phase A turn-on pulse, and the phase A turn-on pulses 72' are generated 216° following the preceding phase B turn-on pulses 76'.

For the following chopper duty cycles as designated by reference numeral 152, the phase relationship between phases A and B is returned to the normal phase relationship of 180° and the conduction periods of phases A and B are returned to 60% duty cycle, assuming 60% duty cycle is still required to satisfy the input demand.

It will be appreciated that since phase A is regarded as the master phase and the other phases are regarded as slaves to phase A, the shortened conduction period due to a phase B overcurrent condition must be maintained until the generation of the next phase A turn-on pulse 72, after which the phase relationship and conduction periods are returned to normal. It will also be appreciated with respect to any of the above-described overcurrent conditions, the return of the conduction periods from the shortened duty cycle to the currently required duty cycle may be made in several steps as opposed to the single step depicted in FIGS. 4 to 6.

The phase control responses referred to above for preventing the occurrence of an overcurrent turn-off in a forbidden zone preceding the current turn-on of another phase are implemented by the microprocessor-based controller 90 depicted in FIG. 7. As indicated above, the microprocessor and its associated control elements execute a main program for generating the control pulses for SCR's 16A, 16B, 32A and 32B. Such program is outlined by the flow diagrams depicted in FIGS. 8 and 9.

As indicated in reference to FIG. 7, the occurrence of an overcurrent condition in either phases A or B generates an interrupt in MPU 92 and the interrupt is serviced by the execution of a subroutine program. The subroutine program determines which of the above-described situations is in effect and takes steps to implement the appropriate response. It will be noted that the interrupt is preferably of the type typically designated IRQ or Interrupt Request, and that the interrupt capability is masked or inhibited while the subroutine is being executed. Thus, the program instructions of the subroutine must directly control the operation of the chopper so that the overcurrent condition is alleviated by the time the execution of the subroutine is completed. The subroutine thus operates to generate a turn-off pulse for the overcurrent phase, to determine the appropriate conduction period of the other phases, and to determine the phase relationship required to ensure that the overcurrent turn-off pulse does not fall within a forbidden zone. With respect to the determination of the suitable conduction period, the conduction period for phase A is stored in a memory register designated PWA and the conduction period for phase B is stored in a memory register designated PWB. The required phase relationship response is denoted by the status of specified memory locations, hereinafter referred to as flags. In accordance with the phase responses described above, the flags are designated LEFT-SHIFT (B), RIGHT-SHIFT (B), and RIGHT-SHIFT (A). LEFT-SHIFT (B) denotes a phase shift according to the teachings of Ser. No. 292,250, depicted in FIG. 3. When the subroutine sets the RIGHT-SHIFT (B) flag, a response of the type depicted in FIG. 4B is required. Correspondingly, when the subroutine sets the RIGHT SHIFT (A) flag, a response of the type depicted in FIG. 6 is required. If a response of the type depicted in FIG. 5 is required, the subroutine clears the LEFT-SHIFT (B) flag.

In lieu of the above-described hardware interrupt wherein the interrupt is only generated if an overcurrent condition is detected, a software interrupt may be used. In such case, an internal timer (such as Timer 1 referred to above) periodically generates an interrupt, and the subroutine that services the interrupt also determines if an overcurrent condition has in fact occurred. In this regard, it will be understood that the choice of one type of interrupt over the other involves a tradeoff between hardware or software complexity, and should not affect the functional response of the system of this invention.

Figure 10:
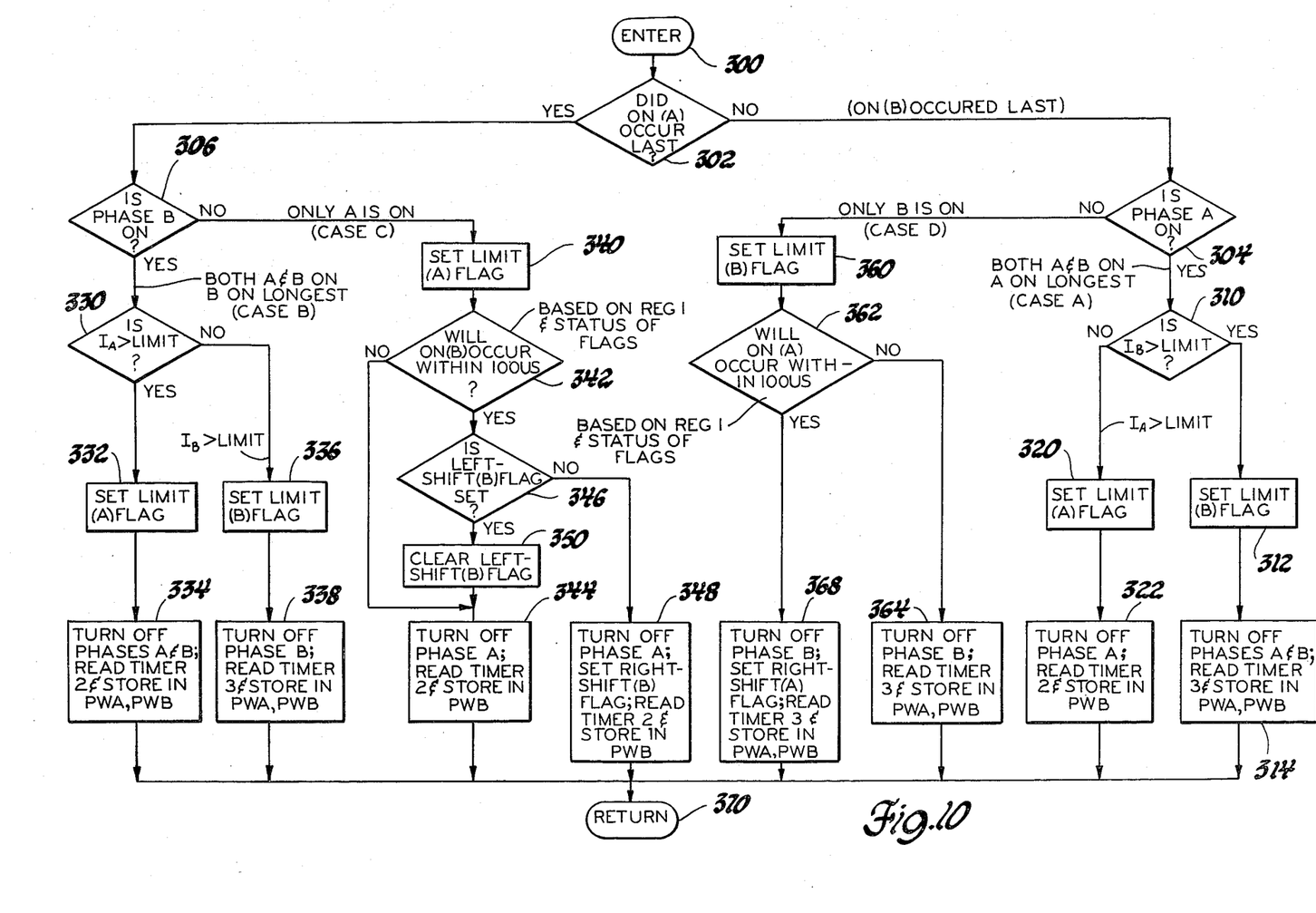

A flow diagram for the overcurrent subroutine is depicted in FIG. 10. Referring now more particularly to FIG. 10, the block labelled ENTER and designated by reference numeral 300 signifies the point in the flow diagram at which MPU 92 enters in response to an uninhibited Interrupt Request. First, the MPU 92 determines whether an ON(A) pulse or an ON(B) pulse occurred most recently, as indicated at instruction block 302. It will be appreciated that this may be determined in a number of ways, such as determining the status of a memory location or flag that is alternately set and cleared when the phase A and phase B turn-on pulses are generated.

If an ON(B) pulse occurred last, then MPU 92 determines if phase A is turned on, as indicated at instruction block 304. If yes, then both phases A and B are on or conductive, and in addition, phase A has been on longest—the situation presented in case A above. If phase A is not on (nonconductive) then only phase B is on—the situation presented in case D.

If the decision of instruction block 302 is answered in the affirmative, an ON(A) pulse occurred last and MPU 92 determines if phase B is on, as indicated at instruction block 306. If yes, both phase A and B are on, and in addition, phase B has been on longest—the situation presented in case B. If phase B is off, then only phase A is on—the situation in case C.

In the case A situation (both phases on; phase A on longest), MPU 92 determines if phase B has reached the current limit, as indicated at instruction block 310. If yes, the LIMIT(B) flag is set as indicated at block 312 and phases A and B are both turned off as indicated at instruction block 314. In addition, the shortened pulse width of phase B is read from Timer 3 and stored in memory registers PWA and PWB so that on the following chopper cycle, the shortened duty cycle will be maintained. If the decision at block 310 is answered in the negative, then phase A has reached current limit. In such case, the LIMIT(A) flag is set as indicated at block 320 and phase A is turned off, as indicated at instruction block 322. In addition, the shortened conduction period of phase A is read from Timer 2 and a digital number corresponding to such conduction period is stored in memory location PWB so that the conduction period of phase B is similarly shortened.

If case B is in effect (phases A and B on; phase B on longest), MPU 92 determines if phase A has reached the current limit; as indicated at instruction block 330. If yes, the LIMIT(A) flag is set as indicated at instruction block 332, and phase A and B are shut off as indicated at instruction block 334. In addition, the shortened duty of phase A is read from Timer 2 and stored in memory registers PWA and PWB so that in the following chopper cycle the shorted conduction period due to overcurrent will be maintained. If instruction block 330 is answered in the negative, then phase B has reached the current limit. Accordingly, the LIMIT(B) flag is set as indicated at instruction block 336, and phase B is turned off as indicated at instruction block 338. In addition, the shortened conduction period of phase B is read from Timer 3 and a digital number corresponding thereto is stored in memory location PWA and PWB so that in the following chopper cycle, the conduction periods of phases A and B are maintained at the shortened duty cycle.

In the situation detailed in case C, (only phase A is conductive), it is assumed that phase A has reached overcurrent and the LIMIT(A) flag is set as indicated at instruction block 340. Then, as indicated at instruction block 342, MPU 92 determines whether an ON(B) pulse will occur within 100 microseconds. That is, will a shut-off due to the phase A overcurrent condition fall within a forbidden zone preceding the next phase B turn-on pulse? As will later become apparent, this determination may be made on the basis of the status of the various flags and the value of a timing register (REG1) described in reference to FIGS. 8 and 9. If not, phase A is turned off as indicated at instruction block 344 and the shortened conduction period of phase A is read from Timer 2 and stored in memory location PWB so that the conduction period of phase B is similarly shortened.

If the decision block designated by reference numeral 342 is answered in the affirmative, MPU 92 determines if the LEFT-SHIFT (B) flag is set, as indicated at instruction block 346. If not, the situation is as shown in FIG. 4A—i.e., 180° phase relationship between phases A and B. In such case, MPU 92 executes instruction block 348 which turns off phase A, sets the RIGHT-SHIFT (B) flag, reads the shortened phase A conduction period from Timer 2, and stores such conduction period in memory location PWB to similarly shorten the phase B conduction period.

If the instruction block designated by reference numeral 346 is determined in the affirmative, the situation is as depicted in FIG. 5A. Accordingly, MPU 92 clears the LEFT-SHIFT (B) flag as indicated at instruction block 350 prior to execution instruction block 344.

For the situation detailed by case D (only phase B is conductive), it is assumed that phase B has reached overcurrent, and MPU 92 sets the LIMIT (B) flag as indicated at instruction block 360. Then MPU 92 executes instruction block 362 to determine if a turn-on pulse for phase A will occur within 100 microseconds. That is, will a phase B turn-off due to the overcurrent condition fall within a forbidden zone preceding a turn-on pulse for phase A? As with block 342, this may be determined by the status of the various flags and the value in register REG1. If not, phase B is turned off as indicated at instruction block 364. In addition, the shortened conduction period of phase B is read from Timer 3 and stored in memory locations PWA and PWB so that in the following chopper cycle, the shortened conduction period will be maintained.

If decision block 362 is answered in the affirmative, the situation is as depicted in FIG. 6A. Accordingly, MPU 92 executes instruction block 368 to turn-off phase B, to set the RIGHT-SHIFT (A) flag, to read the shortened phase B conduction period from Timer 3, and to store such conduction period in memory locations PWA and PWB so that in the following chopper cycle, the shortened conduction period is maintained.

Once the subroutine program turns off the appropriate phase or phases and determines the suitable phase relation response, MPU 92 is returned to the main program at the point where it was interrupted to execute the subroutine, as indicated by RETURN block 370.

Figure 8:
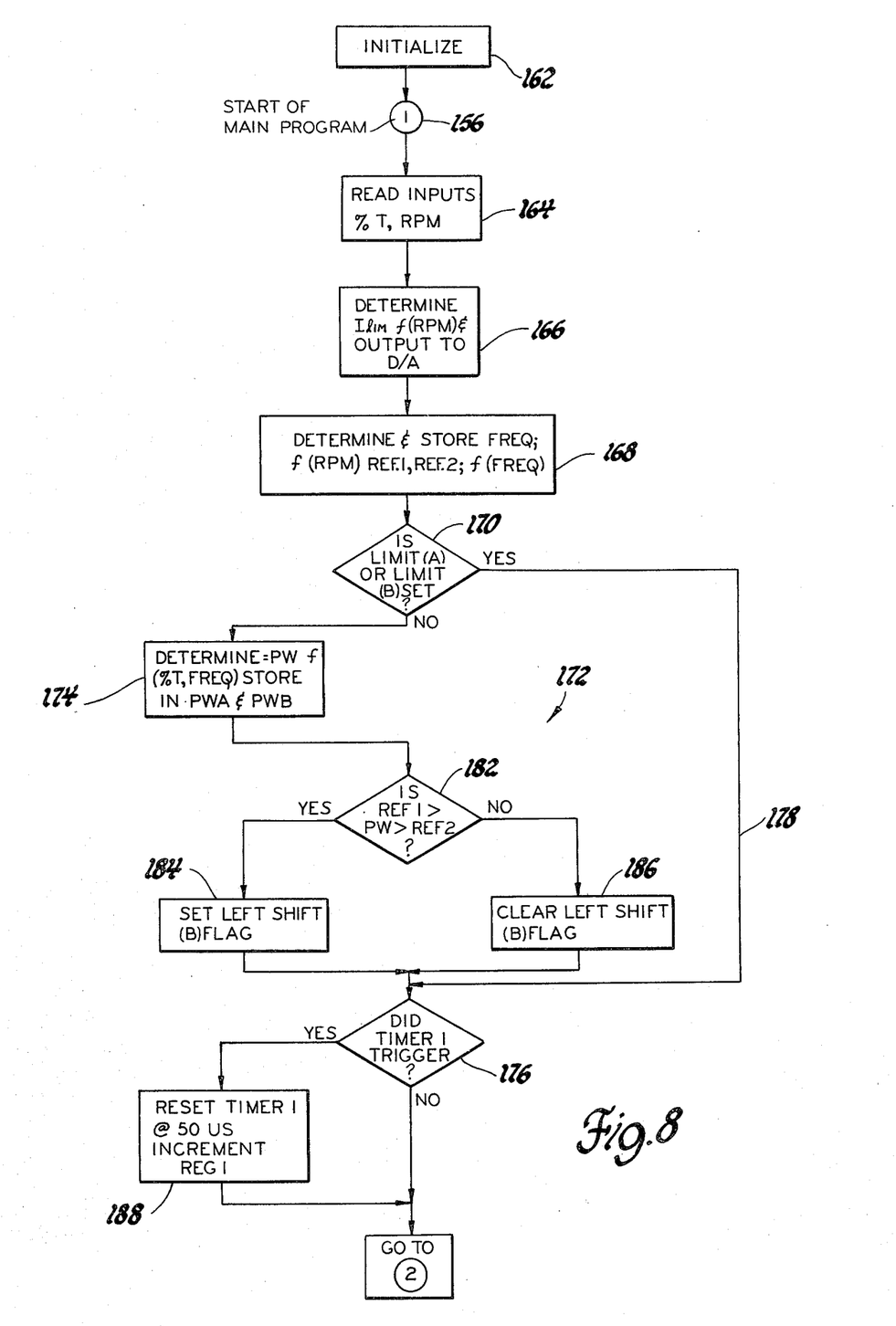
FIGS. 8 through 10 depict flow diagrams for implementing this invention with the control unit of FIG. 7.
Figure 9:
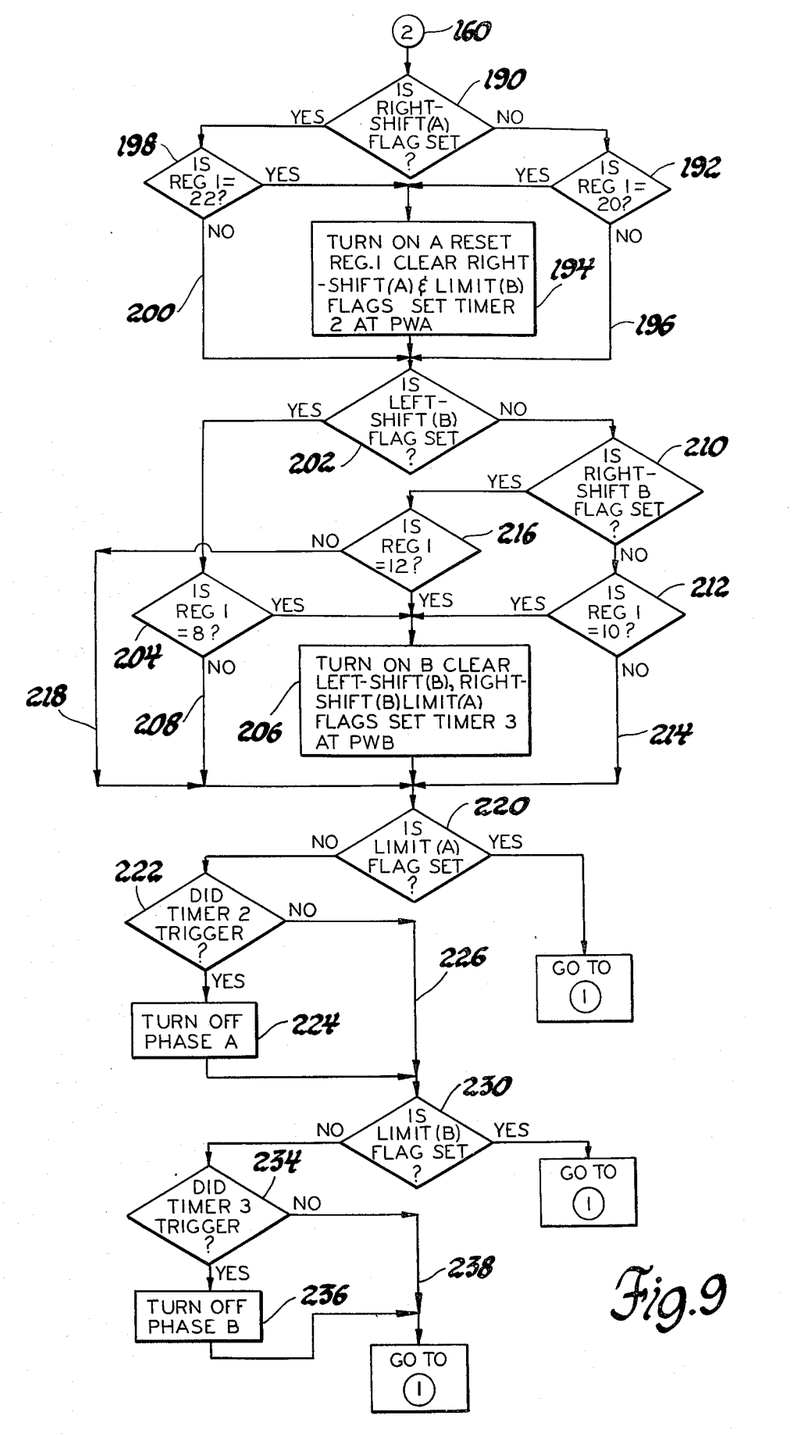

The flow diagram for the main program is depicted in FIGS. 8 and 9. The circled numeral 1 in FIG. 8, designated by reference numeral 156, and the circled numeral 2 in FIG. 9, designated by reference numeral 160, each represent given points in the flow diagram, and thereby serve to provide continuity between FIGS. 8 and 9.

Referring now more particularly to FIG. 8, reference numeral 162 designates a series of program instructions executed when power is first applied to the system for initializing the timers and the various memory registers corresponding to operating parameters such as throttle, RPM, etc. After such instructions have been executed, MPU 92 begins to execute the main program at the point designated by reference numeral 156.

First, the inputs of throttle (%T) and speed (RPM) are read and stored for future use as designated by reference numeral 164. Then a current limit value ($I_{lim}$) is determined as a function of motor speed and outputted as designated by reference numeral 166. As indicated earlier, the current limit value is applied as an input to comparators 112 and 114 by D/A converter 98 via line 110.

MPU 92 then executes instruction block 168 to determine the chopping frequency (FREQ) and the values REF1 and REF2 which define the limits in time of a forbidden zone 80 preceding a phase B turn-on pulse 76. The chopping frequence (FREQ) is determined as a function of motor speed, it being appreciated that for low motor speeds, a chopping frequency lower than 1 kilohertz may be desired to reduce the generation of undesirably short conduction periods. The values of REF1 and REF2 are determined as a function of the number of phases and the chopping period T, REF1 and REF2 being determined according to the expressions REF1=T/2 and REF2=T/2−$T_c$, where $T_c$ is the time required to charge the commutation networks 22A and 22B (100 microseconds).

MPU 92 then determines if an overcurrent condition has occurred in either phase, as designated by decision block 170. This condition may be determined by checking the status of the LIMIT (A) and LIMIT (B) flags. As indicated in reference to FIG. 10, the LIMIT (A) flag is set when phase A reaches overcurrent and the LIMIT (B) flag is set when phase B reaches overcurrent. When power is first applied to the system, such flags are reset by the initialization program instructions designated by reference numeral 160. If either LIMIT (A) flag or LIMIT (B) flags are set, indicating that an overcurrent condition is in existence, MPU 92 skips the program instructions designated generally by reference numeral 172 and begins at instruction block 176 as designated by flow line 178. If both flags are reset, MPU 92 executes the instructions designated by reference numeral 172 prior to executing instruction block 176.

In executing the instruction portion 172, MPU 92 first determines the conduction duration or pulse width (PW) as a function of the accelerator pedal or input demand setting (%T) and the last determined chopping frequency (FREQ), as indicated at block 174. The pulse width so determined is stored in memory registers PWA and PWB for later use in developing the SCR control pulses. In this way, the conduction periods of phases A and B are made equal under normal conditions wherein an overcurrent condition does not exist.

Then MPU 92 determines whether the last determined pulse width (PW) falls between the values REF1 and REF2, as designated by instruction block 182. If so, the scheduled turn-off pulses fall within the forbidden zones preceding turn-on pulses for the other phases, and the normal phase relationship of 180° is modified to 144° in accordance with the teachings of Ser. No. 292,250. Thus, the turn-on pulses for phase B are advanced by 100 microseconds, such phase advance being designated as a LEFT-SHIFT for phase B. Accordingly, MPU 92 sets the LEFT-SHIFT (B) flag under such conditions as indicated at instruction block 184. If the pulse width (PW) does not fall between values REF1 and REF2, MPU 92 clears the LEFT-SHIFT (B) flag as indicated at instruction block 186. In view of the above, it should be apparent that the status of the LEFT-SHIFT (B) flag is determined according to the predicted occurrence of a turn-off pulse in a forbidden zone based on the last determined chopping frequency (FREQ) and conduction period PW.

The portion of the flow diagram beginning at instruction block 176 relates to the operation and manipulation of Timers 1-3. As indicated above in reference to FIG. 7, Timers 1-3 are embodied in timer element 96, and are separately controlled by MPU 92 to establish various time intervals. Timer 1 is used to establish shot duration timing periods for controlling the phase relationship between turn-on pulses for phases A and B. The duration of such period is somewhat arbitrary, and in the preferred embodiment is set at 50 microseconds. Timer 2 is used to develop turn-off pulses for phase A and Timer 3 is used to develop turn-off pulses for phase B. Thus, current turn-offs for phases A or B that are initiated by the overcurrent subroutine are implemented by loading a zero into Timers 2 or 3, respectively.

At instruction block 176, MPU 92 determines if Timer 1 has triggered. If so, the timer is reset at 50 microseconds as indicated by instruction block 188. In implementing such instruction, MPU 92 loads a digital number into Timer 1 so that at the specified clocking rate, Timer 1 will trigger again in 50 microseconds. In addition, a memory location designated REG1 is incremented for accumulating the number of 50 microsecond intervals that have elapsed since register REG1 has been reset. When power is initially applied to the system, register REG1 and each of the timers are reset to zero, as indicated above. If Timer 1 has not triggered, the execution of instruction block 188 is skipped. In either case, MPU 92 proceeds to the point in the flow diagram represented by the circled numeral 2 in FIG. 9.

As indicated, the accumulated count in register REG1 is used in developing the turn-on and turn-off pulses for phases A and B to produce the desired conduction periods and phase relationships. For the purpose of clarity, it will be assumed in reference to the flow diagram in FIG. 9 that the chopping frequency is maintained at 1 kilohertz, corresponding to a chopping period of 1,000 microseconds. Where a numerical value is given in dependence on such assumption, the more general expression for such value is given in this description. Also, it is assumed that each forbidden zone or predetermined time is 100 microseconds in duration.

In order to develop phase A turn-on pulses, MPU 92 must know the chopping period and whether a RIGHT-SHIFT (A) mode of operation is in effect. Thus, MPU 92 determines if the RIGHT-SHIFT (A) flag is set as indicated at instruction block 190. If the flag is not set, the turn-on pulses for phase A are spaced by the chopping period of 1,000 microseconds. Accordingly, MPU 92 determines if the accumulated count in register REG1 is equal to 20, as indicated at instruction block 192. Since the intervals established by Timer 1 are 50 microseconds in duration, an accumulated count of 20 corresponds to 1,000 microseconds. With a variable chopping frequency, the number 20 is replaced by the expression ($T_m$/50), where $T_m$ is the chopping period in microseconds.

If the count in register REG1 is equal to 20, a phase A turn-on pulse is required and MPU 92 executes instruction block 194. If not, a phase A turn-on pulse is not required and MPU 92 skips instruction block 194 as indicated by flow diagram line 196.

If instruction block 190 is answered in the affirmative (RIGHT-SHIFT (A) flag set), MPU 92 determines if the accumulated count in register REG1 is equal to 22 as indicated at instruction block 198. Since Timer 1 establishes intervals to 50 microseconds, an accumulated count in register REG1 of 22 corresponds to 1,100 microseconds—a delay of 100 microseconds ($T_c$) compared to the normal chopping period T. At variable chopping frequency, the number 22 is thus replaced by the value of the expression ($T_m$/50)+2. If the accumulated count is equal to 22, MPU 92 executes instruction block 194 for developing a phase A turn-on pulse. If not, MPU 92 skips instruction block 194 as indicated by flow diagram line 200.

As indicated, the execution of instruction block 194 generates a turn-on pulse for phase A. In addition, register REG1 is reset to zero, the RIGHT-SHIFT (A) and LIMIT (B) flags are reset, and the contents of the memory location designated PWA is loaded into Timer 2. As indicated above, Timer 2 is used to develop turn-off pulses for phase A and the conduction period of phase A is thereby set at the value of PWA. By clearing the RIGHT-SHIFT (A) and LIMIT (B) flags, MPU 92 clears the overcurrent condition so that the chopper may return to normal operating current levels in the absence of a further interrupt.

MPU 92 then determines if the LEFT-SHIFT (B) flag is set as indicated at instruction block 202. If yes, chopper operation is as depicted in FIG. 3A—phase B turn-on pulses occur 144° (400 microseconds) after the phase A turn-on pulses. In such case, MPU 92 executes instruction block 204 to determine if the accumulated count in register REG1 is equal to 8. If yes, 400 microseconds have elapsed since the generation of a phase turn-on pulse for phase A and MPU 92 generates a turn-on pulse for phase B as indicated at instruction block 206. If the count in register REG1 is not equal to 8, MPU 92 skips instruction block 206 as indicated by flow line 208. For variable chopping frequency operation, the number 8 is replaced by the expression $(T_m/100) - 2$.

If instruction block 202 is answered in the negative (LEFT-SHIFT (B) flag clear), MPU 92 determines if the RIGHT-SHIFT (B) flag is set as indicated at instruction block 210. If not, the chopper operation is as depicted in FIG. 2—180° (500 microseconds) separation between the turn-on pulses for phases A and B. In such case, MPU 92 determines if the accumulated count in register REG1 is equal to 10 as indicated at instruction block 212. If yes, 500 microseconds have elapsed since the generation of the last phase A turn-on pulse (instruction block 194) and MPU 92 executes instruction block 206 to generate a turn-on pulse for phase B. If the count in register REG1 is not equal to 10, MPU 92 skips instruction block 206 as indicated by flow line 214. For variable chopping frequency operation, the number 10 is replaced by the expression $(T_m/100)$.

If instruction block 210 is answered in the affirmative (RIGHT-SHIFT (B) flag set), the chopper operation is as shown in FIG. 4A—phase B turn-on pulses occur 216° (600 microseconds) after the turn-on pulses for phase A. In such case, MPU 92 determines if the count in register REG1 is equal to 12, as indicated at instruction block 216. If yes, 600 microseconds have elapsed since the generation of a phase A turn-on pulse at instruction block 194 and MPU 92 executes instruction block 206 to generate a turn-on pulse for phase B. If the count in register REG1 is not equal to 12, MPU 92 skips instruction block 206 as indicated by flow line 218. For variable chopping frequency operation, the number 12 is replaced by the expression $(T_m/100) + 2$.

In addition to generating a turn-on pulse for phase B, the execution of instruction block 206 also operates to clear the LEFT-SHIFT (B), RIGHT-SHIFT (B), and LIMIT (B) flags and to load the contents of memory location PWB into Timer 3. As indicated with reference to instruction block 194, the clearing of the flags returns the chopper phase separation to the normal value (180°) in the absence of a further overcurrent interrupt. Since Timer 3 controls the generation of turn-off pulses for phase B, the conduction period of phase B is set at a level corresponding to the digital number stored in memory location PWB.

MPU 92 then determines if the LIMIT (A) flag is set as indicated at instruction block 220. If not, MPU 92 determines if Timer 2 has triggered as indicated at instruction block 222. If Timer 2 has triggered, a turn-off pulse for phase A is generated as indicated at instruction block 224. If Timer 2 has not triggered, MPU 92 skips instruction block 224 as indicated by flow line 226.

If instruction block 220 is answered in the affirmative, an overcurrent condition is in effect and the subroutine described in reference to FIG. 10 controls the generation of turn-off pulses. In such condition, MPU 92 proceeds to the point in the flow diagram represented by the circled numeral 1 in FIG. 8.

If the LIMIT (A) flag is not set, MPU 92 determines if the LIMIT (B) flag is set, as indicated at instruction block 230. If so, an overcurrent condition is in effect and the subroutine described in reference to FIG. 10 controls the turn-off pulses for phase B. In such condition, MPU 92 proceeds to the point in the flow diagram represented by the circled numeral 1 in FIG. 8. If the LIMIT (B) flag is not set, MPU 92 determines if Timer 3 has triggered as indicated by instruction block 234. If yes, MPU 92 generates a turn-off pulse for phase B as indicated at block 236. If Timer 3 has not triggered, MPU 92 skips instruction block 236 as indicated by flow line 238. MPU 92 then proceeds to the point in the flow diagram represented by the circled numeral 1 in FIG. 8.

Heretofore, the predetermined period or forbidden zone has been defined as an interval preceding a turn-on pulse for one phase during which the generation of a turn-off pulse for another phase is not allowable. It will be appreciated, however, that the forbidden zone may alternately be defined as an interval following a turn-off pulse for one phase during which the generation of a turn-on pulse for another phase is not allowable. The difference is viewed merely as a matter of semantics and, in either case, the control responses (shifting the scheduled occurrence of a turn-on pulse) of this invention are identical.

Although this invention has been described in reference to a two-phase chopper, it has been indicated and it should be apparent that the invention is equally applicable to a chopper having three or more phases. For any such chopper configuration, the appropriate control response for an overcurrent condition is dictated by the rules given above in reference to FIGS. 8-10. Thus, the conduction period of any chopper phase reaching current limit is terminated immediately. Any other chopper phases that have been conducting for a longer period of time, are also turned off at this time. The conduction periods of other phases that have been on for a shorter period of time or that have not yet been turned on, are similarly shortened in order to provide balanced phase conduction.

In addition, the technique used by the subroutine program for determining which chopper phase has reached overcurrent and which chopper phases have been on for a shorter or longer time than the overcurrent phase, is also applicable to a choppper configuration having three or more phases. Thus, it is first determined, as exemplified by instruction block 302 in FIG. 10, to determine which phase received a turn-on pulse last. Next, it is determined, as exemplified by instruction blocks 304 and 306 in FIG. 10, whether any other phases are on. If the phase receiving a turn-on pulse last is the only conductive phase, it is obviously the overcurrent phase and a turn-off pulse for such phase is generated immediately. If other phases are also conductive, it is first determined as exemplified by instruction blocks 310 and 330 in FIG. 10, whether the chopper phase having the shortest conduction period (the last phase to receive an ON pulse) has reached overcurrent. If so, it and all other phases are turned off immediately. If not, it is determined if the chopper phase having the next shortest conduction period has reached overcurrent. If so, it and all other phases on for a longer period of time are turned off. The decision process continues until the overcurrent phase is turned off. As with the two-phase chopper control described in reference to FIG. 10, the conduction periods of chopper phases that have been on for a shorter period of time than the overcurrent phase are shortened to the same conduction period as the overcurrent phase.

The phase control responses (i.e., LEFT-SHIFT, RIGHT-SHIFT, etc.) for a chopper having three or more phases are also analogous to the responses for a two-phase chopper as described in reference to FIG. 10. Thus, if the chopper is operating at normal (balanced) phase relationship, and an overcurrent condition in one phase occurs within an otherwise forbidden zone preceding a turn-on pulse for another phase, the current in the one phase is turned off and the turn-on pulses for the other phases are delayed or LEFT-SHIFTED to effectively shift the forbidden zones. If the chopper is operating at modified phase relationship as described in Ser. No. 292,250 and in reference to FIG. 3 herein, and an overcurrent condition in one phase occurs within an otherwise forbidden zone preceding a turn-on pulse for another phase, the current in the one phase is turned off and the modified phase relationship is cancelled.

Although this invention has been described herein in reference to a specific embodiment, it will be understood that various modifications to such embodiment will occur to those skilled in the art, and that such modifications may be within the scope of this invention as defined by the appended claims.

The embodiments of the invention in which an exclusive property or privilege is claimed are defined as follows:

1. A chopper mechanism of the type wherein current from a common source is sequentially applied to a load through at least two separate current paths in like duration pulses and at a common repetition rate and wherein the current turn-off in each path must be either after or more than a predetermined time prior to the initiation of current flow in the other path to ensure reliable current commutation, the improvement comprising:
   phase control means normally effective to initiate current flow in the paths according to a predetermined phase relationship;
   overcurrent turn-off means responsive to the magnitude of current in each path and operative to cause a current turn-off for any path wherein the current exceeds a reference limit; and
   means activated by operation of said overcurrent turn-off means for overriding said phase control means and delaying the initiation of current flow in the other path when the current turn-off caused by said overcurrent turn-off means would fall within the predetermined time prior to the normal initiation of current in said other path so that said predetermined time occurs after the overcurrent turn-off by a time at least as long as said predetermined time, thereby ensuring reliable current commutation.

2. A chopper mechanism of the type wherein current from a common source is sequentially applied to a load through at least two separate current paths in like duration pulses and at a common repetition rate and wherein the current turn-off in each path must be either after or more than a predetermined time preceding the current turn-on in the other path to ensure reliable current commutation, the improvement comprising:
   means normally effective in response to the initiation of current flow in one path to initiate current flow in the said other path in predetermined phase relationship therewith;
   additional means responsive to the time spacing of said pulses and their duration effective to identify when the current turn-off in either path would occur within said predetermined time;
   phase-shift means for said other path activated by said additional means to advance the current turn-on in said other path with respect to the current turn-on in said one path by an amount at least as great as said predetermined time to prevent a current turn-off within said predetermined time; and
   means responsive to the magnitude of current in said one path and operative when such current exceeds a reference limit to turn-off current in said one path and to deactivate said phase-shift means if the current turn-off in said one path would occur within the predetermined time preceding the advanced current turn-on in said other path, whereby reliable current commutation and overcurrent protection are ensured.

3. A chopper mechanism of the type wherein current from a common source is sequentially applied to a load through at least two separate conduction paths in like duration pulses and at a common repetition rate and wherein the current turn-on in each path must be either prior to or more than a predetermined time after a current turn-off in the other path to ensure reliable current commutation, the improvement comprising:
   phase control means normally effective to control current turn-on in the paths according to a predetermined phase relationship;
   overcurrent turn-off means responsive to the magnitude of current in each conduction path and operative to cause a current turn-off for any one path wherein the current exceeds a reference limit; and
   means activated by operation of said overcurrent turn-off means for overriding said phase control means and delaying the current turn-on in the other path when such current turn-on would otherwise fall within the predetermined time after the current turn-off caused by said overcurrent turn-off means so that the current turn-on in said other path occurs after the overcurrent turn-off by a time at least as long as said predetermined time, thereby ensuring reliable current commutation.

4. In a chopper mechanism of the type wherein current from a common source is sequentially applied to a load through at least two separate conduction paths at a common repetition rate, apparatus comprising:
   means responsive to an input demand signal and normally operative to control current turn-off in the path so as to establish substantially equal duration current pulses in said paths for satisfying such input demand, thereby minimizing the ripple content of the current drawn from said source;

overcurrent turn-off means responsive to the magnitude of current in each conduction path and operative when the current in any one path exceeds a reference current limit value to substantially immediately turn-off current in such one path, thereby establishing a shortened current pulse duration in said one path to protect said chopper mechanism; and means activated by said overcurrent turn-off means for controlling current turn-off in the other path such that the current pulse duration in such other path is substantially equal to the shortened current pulse duration in said one path, to thereby maintain minimization of the ripple content of the current drawn from said source.

5. A chopper mechanism of the type wherein current from a common source is sequentially applied to a load through two or more separate current paths in like duration pulses and at a common repetition rate and wherein the current turn-off in each path must be either after or more than a predetermined time prior to the initiation of current flow in the other path to ensure reliable current commutation, the improvement comprising:

phase control means normally effective to initiate current flow in the paths according to a predetermined phase relationship;

overcurrent turn-off means responsive to the magnitude of current in each path and operative when the current in any one path exceeds a reference limit to turn-off current in such one path, thereby establishing a shortened current pulse duration in said one path to protect said chopper mechanism and said load, said overcurrent turn-off means being further operative to turn-off the current in any of the other paths wherein the current pulse duration exceeds said shortened current pulse duration, and to maintain said shortened current pulse duration in any of said other paths wherein the current pulse duration is less than said shortened current pulse duration; and means activated by operation of said overcurrent turn-off means for overriding said phase control means and delaying the initiation of current flow in said other paths when the current turn-off caused by said overcurrent turn-off means would fall within the predetermined time prior to the normal initiation of current flow in one of said other paths so that said predetermined time occurs after the overcurrent turn-off by a time at least as great as said predetermined time, thereby ensuring reliable current commutation.

* * * * *

UNITED STATES PATENT AND TRADEMARK OFFICE
CERTIFICATE OF CORRECTION

PATENT NO. : 4,433,370

DATED : February 21, 1984

INVENTOR(S) : Sam M. Daradsheh; Thomas A. Radomski

It is certified that error appears in the above—identified patent and that said Letters Patent is hereby corrected as shown below:

Column 3, line 37, "inductor 28A and 28B" should read -- inductor 28A or 28B --.

Column 7, line 4, "trace to" should read -- trace of --.

Column 7, line 67, "phase condition" should read -- phase conduction --.

Column 9, line 6, "condition" should read -- conditions --.

Column 11, line 37, "phase" should read -- phases --.

Column 11, line 49, "location" should read -- locations --.

Column 12, line 34, "situation is a" should read -- situation is as --.

Column 13, line 68, "shot" should read -- short --.

Signed and Sealed this

Eighteenth Day of September 1984

[SEAL]

Attest:

GERALD J. MOSSINGHOFF

Attesting Officer

Commissioner of Patents and Trademarks